US008440000B2

(12) United States Patent
Wilcox

(10) Patent No.: US 8,440,000 B2
(45) Date of Patent: May 14, 2013

(54) NITROGEN-PERMEABLE MEMBRANES AND USES THEREOF

(75) Inventor: Jennifer Wilcox, Half Moon Bay, CA (US)

(73) Assignee: Board of Trustees of Leland Stanford Junior University, Palo Alto, CA (US)

( * ) Notice: Subject to any disclaimer, the term of this patent is extended or adjusted under 35 U.S.C. 154(b) by 239 days.

(21) Appl. No.: 13/011,748

(22) Filed: Jan. 21, 2011

(65) Prior Publication Data
US 2011/0182797 A1     Jul. 28, 2011

Related U.S. Application Data

(60) Provisional application No. 61/336,518, filed on Jan. 22, 2010.

(51) Int. Cl.
*B01D 53/22* (2006.01)
*B01D 71/02* (2006.01)
*C01C 1/04* (2006.01)

(52) U.S. Cl.
USPC ............... 95/47; 95/45; 95/55; 95/56; 96/11; 423/359

(58) Field of Classification Search ............... 95/45, 47, 95/55, 56; 96/4, 11; 423/359
See application file for complete search history.

(56) References Cited

U.S. PATENT DOCUMENTS

| | | | | |
|---|---|---|---|---|
| 4,741,744 A * | 5/1988 | Wu et al. | ............................. | 95/47 |
| 4,810,485 A * | 3/1989 | Marianowski et al. | ............ | 95/56 |
| 5,215,729 A * | 6/1993 | Buxbaum | ............................. | 95/56 |
| 5,378,263 A | 1/1995 | Prasad | | |
| 5,588,984 A | 12/1996 | Verini | | |
| 6,475,268 B2 * | 11/2002 | Thornton | ............................. | 96/11 |
| 6,579,341 B2 * | 6/2003 | Baker et al. | ............................. | 95/47 |
| 2003/0213365 A1 | 11/2003 | Jantsch et al. | | |
| 2006/0070524 A1 | 4/2006 | Inoue et al. | | |
| 2008/0000350 A1 * | 1/2008 | Mundschau et al. | ............ | 95/56 |
| 2008/0311022 A1 * | 12/2008 | Carrington et al. | ............ | 423/359 |

OTHER PUBLICATIONS

PCT/US2011/022143. Applicant: The Board of Trustees of the Leland Stanford Junior University. Int'l Search Report—Written Opinion (Oct. 28, 2011).
Wilcox, et al. "Atomic Nitrogen and Hydrogen Behavior in Group V Metals." AIChE Ann. Conf. Salt Lake City, UT (2010).
Ozdogan, E.; Rochana, P; Wilcox, J. "Nitrogen adsorption, solubility, and transport within Group V metals", 241st American Chemical Society Meeting, Anaheim (Mar. 2011).
Rochana, P.; Ozdogan E.; Wilcox, J "Nitrogen adsorption, solubility and transport within Group V metals", American Physics Society Meeting, Dallas TX, (Mar. 2011).
Wilcox, J.; Rochana, P.; Ozdogan, E. "Atomic Nitrogen and Hydrogen Behavior in Group V Metals", AIChE Annual Conference, Salt Lake City (Nov. 2010).

* cited by examiner

*Primary Examiner* — Jason M Greene

(74) *Attorney, Agent, or Firm* — Foley & Lardner LLP

(57) ABSTRACT

A nitrogen-permeable structure includes a porous support and a nitrogen-permeable membrane adjacent to the porous support. The nitrogen-permeable membrane includes a first metal and a second metal, wherein the first metal is selected from niobium, tantalum, and vanadium, and the second metal is different from the first metal.

15 Claims, 8 Drawing Sheets

US 8,440,000 B2

NITROGEN-PERMEABLE MEMBRANES AND USES THEREOF

CROSS REFERENCE TO RELATED APPLICATION

This application claims the benefit of U.S. Provisional Application No. 61/336,518, filed on Jan. 22, 2010, the disclosure of which is incorporated herein by reference in it entirety.

FIELD OF THE INVENTION

The invention relates generally to membranes that are selectively permeable for certain gaseous species. More particularly, the invention relates to nitrogen-permeable membranes and uses thereof.

BACKGROUND

The United States produces over 300 GW of power from pulverized coal combustion. This power output, representing about 50 percent of the total annual power output, is responsible for more than 30 percent of annual $CO_2$ emissions in the United States. In order to reduce $CO_2$ emissions from coal combustion, it is desirable to retrofit existing coal-fired power plants with post-combustion capture technology. Currently, amine scrubbing is the technology of choice for post-combustion capture of $CO_2$. However, amine scrubbing technology comes with its challenges and still has not proven to be successful on the scale of carbon capture required for the current coal fleet.

It is against this background that a need arose to develop the nitrogen-permeable membranes and related methods and systems described herein.

SUMMARY

One aspect of the invention relates to a nitrogen-permeable structure. In one embodiment, the nitrogen-permeable structure includes: (a) a porous support; and (b) a nitrogen-permeable membrane adjacent to the porous support and including a first metal and a second metal. The first metal is selected from niobium, tantalum, and vanadium, and the second metal is different from the first metal. For example, the first metal can be alloyed or doped with the second metal.

Another aspect of the invention relates to a method of operating a nitrogen-permeable membrane. In one embodiment, the method includes: (a) providing a nitrogen-permeable membrane having a feed side and a permeate side, wherein the nitrogen-permeable membrane includes a first metal and a second metal, the first metal is selected from niobium, tantalum, and vanadium, and the first metal is at least one of alloyed and doped with the second metal that is different from the first metal; and (b) exposing the feed side of the nitrogen-permeable membrane to a feed stream including nitrogen, such that atomic nitrogen is transported across the nitrogen-permeable membrane from the feed side to the permeate side.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

Nitrogen-Permeable Membranes

Figure 1:
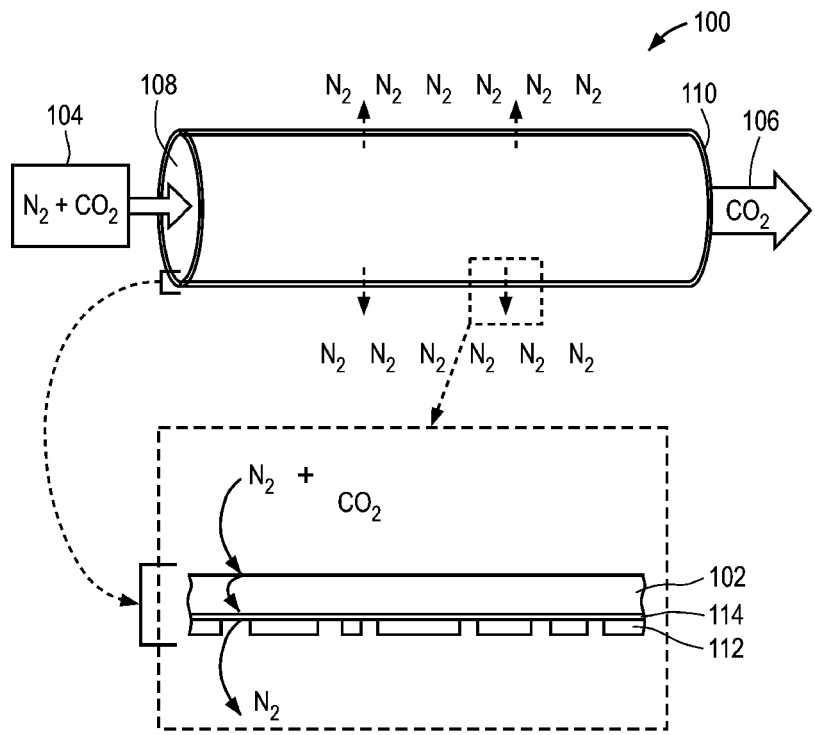
FIG. 1 illustrates a nitrogen-permeable structure implemented in accordance with an embodiment of the invention.
Figure 2:
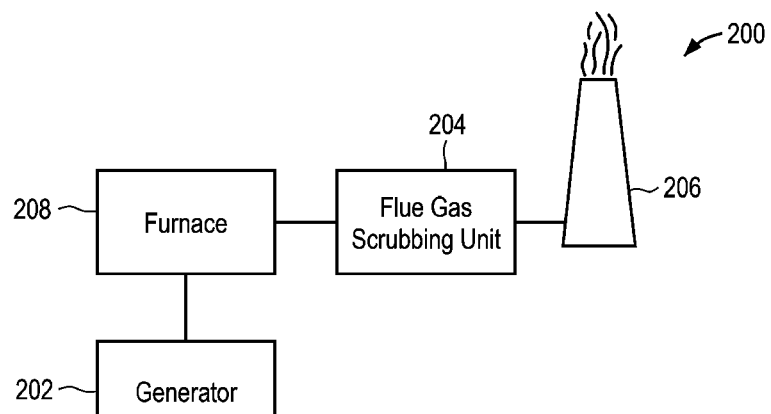
FIG. 2 illustrates a coal-fired power plant including the nitrogen-permeable structure of FIG. 1, according to an embodiment of the invention.

Attention first turns to FIG. 1 and FIG. 2, which illustrate an embodiment of a nitrogen-permeable structure 100 and an embodiment of a coal-fired power plant 200 including the nitrogen-permeable structure 100. By way of preview, the illustrated embodiments relate to a selective-nitrogen technology that takes advantage of the driving force of molecular nitrogen (e.g., $N_2$) in a feed stream 104 of flue gas. This technology implements a nitrogen-permeable membrane 102 in the form of a catalytic, dense membrane on which $N_2$ dissociates and then diffuses through the membrane 102 as atomic nitrogen (e.g., N). When referring to a "dense" membrane, it is contemplated that such a membrane is substantially non-porous, since atomic nitrogen can diffuse through interstitial sites of a lattice or spaces between atoms that form the membrane.

As illustrated in FIG. 2, the power plant 200 includes a furnace 208, which carries out pulverized coal combustion to produce heated steam and flue gas. The heated steam is conveyed to a generator 202 that produces electricity, while the flue gas is conveyed to a flue 206 for release into the atmosphere. Referring to FIG. 1 and FIG. 2, the nitrogen-permeable structure 100 along with the membrane 102 are included in a flue gas scrubbing unit 204, which is coupled between the furnace 208 and the flue 206. The $CO_2$ concentration in the flue gas of pulverized coal combustion is typically too small of a driving force to take advantage of a conventional membrane technology for selective $CO_2$ capture. Advantageously, the illustrated embodiments provide indirect $CO_2$ capture by selectively removing $N_2$ from the flue gas stream 104, thereby yielding an output stream 106 that is enriched in $CO_2$. A mass fraction of $N_2$ in the flue gas stream 104 can be about 73 percent (about 77 mol. percent) with a $CO_2$ mass fraction at about 18 percent (about 12 mol. percent). The power plant 200 can have an operational capacity of about 500 MegaWatt electric ("MWe"), and can emit on average about 1,800 tons/hr (about 18,000 mol/s) of $N_2$. Therefore, in order to effectively create the $CO_2$ output stream 106 that is substantially devoid of $N_2$, the membrane 102 can be implemented to capture $N_2$ at this rate. The captured $N_2$ can be released into the atmosphere through the flue 206, or can be collected for storage. In addition to the nitrogen-permeable structure 100, the flue gas scrubbing unit 204 can include conventional flue gas scrubbing equipment, such as a selective catalytic reduction unit for $NO_x$ removal, a flue gas desulfurization unit for $SO_x$ removal, an electrostatic precipitator for particulate removal, and a compression unit for water vapor removal. By leveraging the selective-nitrogen technology along with conventional flue gas scrubbing equipment, this combined technology has the capability of providing the substantially pure (e.g., up to about 96 percent or more in terms of mass fraction or mol. percent) $CO_2$ output stream 106 for subsequent transport and storage. The nitrogen-permeable structure 100 is desirably coupled directly after the furnace 208 to take advantage of the elevated temperature environment, although the positioning of the nitrogen-permeable structure 100 can be varied for other implementations.

Referring to FIG. 1, the nitrogen-permeable structure 100 has a cylindrical or tubular configuration, in which the feed stream 104 enters the nitrogen-permeable structure 100 through one opening 108, is conveyed through an inner passageway, and then exits through another opening 110 as the output stream 106. As the feed stream 104 is conveyed through the inner passageway, an inner, feed side of the membrane 102 is exposed to the feed stream 104, such that molecular nitrogen is captured and transported as atomic nitrogen across the membrane 102. Once transported across the membrane 102, atomic nitrogen undergoes recombination and desorption back to molecular nitrogen that is released adjacent to an outer, permeate side of the membrane 102. Other configurations of the nitrogen-permeable structure 100 are contemplated, such as other planar or non-planar configurations. It is also contemplated that the feed stream 104 can be conveyed across an exterior of the nitrogen-permeable structure 100, such that nitrogen is captured adjacent to an outer, feed side of the membrane 102 and transported across the membrane 102 for release within the inner passageway and adjacent to an inner, permeate side of the membrane 102.

In the illustrated embodiment, the membrane 102 includes a primary metal, such as one selected from Group 5 metals (e.g., niobium ("Nb"), tantalum ("Ta"), and vanadium ("V")) that have strong binding characteristics towards nitrogen and can facilitate adsorption, dissociation, and diffusion of nitrogen at elevated temperatures similar to the post-furnace conditions of a coal-fired power plant. Along with their desirable binding characteristics, Group 5 metals typically have a body centered cubic ("bcc")-based crystalline structure, which provides a desirable lattice spacing to allow diffusion of atomic nitrogen through a bulk of the crystalline structure. In addition to the primary metal, the membrane 102 includes at least one secondary metal, such as one selected from Group 8 metals (e.g., iron ("Fe") and ruthenium ("Ru")), Group 9 metals (e.g., cobalt ("Co")), Group 10 metals (e.g., nickel ("Ni"), palladium ("Pd"), and platinum ("Pt")), and Group 11 metals (e.g., copper ("Cu"), gold ("Au"), and silver ("Ag")). It will be understood that metals such as Ag, Au, Pd, and Pt also can be referred as precious metals.

Advantageously, the inclusion of a secondary metal allows transport and other characteristics of a primary metal to be adjusted to desirable levels. Specifically, the secondary metal can be included as an alloying or doping material, such as by alloying or doping the primary metal with the secondary metal to form a binary or higher order alloy with improved transport characteristics relative to the absence of the secondary metal. Such improvements in transport characteristics can arise from geometric effects, such as by adjusting a lattice spacing, electronic effects, such as by adjusting a charge distribution within a lattice, or a combination of both effects. For example, atoms of the secondary metal (e.g., Ru) can be included within the lattice in place of atoms of the primary metal (e.g., V), thereby yielding a lattice expansion to provide an improved lattice spacing for atomic nitrogen diffusion. As another example, the inclusion of the secondary metal within the lattice can yield a lattice contraction or expansion to provide an improved selectivity towards diffusion of atomic nitrogen, relative to diffusion of a competing atomic species. As a further example, alloying or doping with the secondary metal can influence an electronic structure and related charge distribution of the lattice, thereby reducing an interaction between atoms of the primary metal and atomic nitrogen and enhancing transport of atomic nitrogen through the lattice. By appropriate selection of the secondary metal and by controlling an amount of the secondary metal, transport characteristics of the membrane 102 can be optimally tuned. For example, the amount of the secondary metal as an alloying or doping material can be no greater than about 15 percent by weight of a resulting alloy, such as no greater than about 10 percent by weight, or no greater than about 5 percent by weight, and down to about 0.5 percent by weight, down to about 0.1 percent by weight, or less. For certain implementations, the amount of the secondary metal can be no greater than about 5 percent by weight so as to substantially retain a mechanical workability of the primary metal. Alternatively, or in combination with alloying or doping, the secondary metal can be incorporated as a coating, such as one applied by sputtering or another suitable deposition technique, or in the form of nanoparticles, whether in the form of a coating or dispersed within a bulk of the membrane 102.

Under a high partial pressure of $N_2$ in the feed stream 104 (e.g., about 0.77 atm), $N_2$ can be adsorbed to under-coordinated top sites of an exposed surface of the membrane 102. Due to the under-coordination of the tops sites, these sites can readily donate electron density into the anti-bonding orbitals of $N_2$, which weakens the triple bond of $N_2$ leading to its dissociation. Adsorption of $N_2$ also can occur at other binding sites, such as short-bridge, long-bridge, and three-fold sites in the case of a (110) surface, and step sites in the case of a stepped surface. Advantageously, $N_2$ can bind to the membrane 102 preferentially over another gaseous species such as $CO_2$.

Catalytic activity on both sides of the membrane 102 can be a relevant design parameter, since $N_2$ undergoes dissociation on the feed side of the membrane 102 prior to diffusion and then undergoes (1) recombination and desorption or (2) reaction with hydrogen to produce ammonia on the permeate side (as further explained with reference to FIG. 4). Factors relevant to such catalytic activity include the bond strength of $N_2$ adjacent to an exposed surface of the membrane 102 and related dissociation barrier, as well as energetic costs to activate adsorbed nitrogen for either recombination to $N_2$ or for further reaction with hydrogen to produce ammonia. At elevated temperatures similar to the post-furnace conditions of a coal-fired power plant, at least a fraction, if not all, of the barrier for $N_2$ dissociation can be available, with any remaining fraction supplied by a suitable source of energy. Modifying an exposed surface of the membrane 102 can lower the dissociation barrier, such as through alloying or doping with a secondary metal that catalyzes $N_2$ dissociation at the exposed surface. Alternatively, or in combination, nanoparticles of the secondary metal can be deposited on the exposed surface to provide a catalytic surface area and a high concentration of under-coordinated sites to facilitate $N_2$ dissociation.

After $N_2$ dissociation, the resulting atomic nitrogen can diffuse into the subsurface and undergo hopping through interstitial octahedral-sites (or O-sites) and tetrahedral-sites (or T-sites) of a lattice. For example, the diffusivity of atomic nitrogen in a V lattice can be a function of temperature, ranging from about $2.79 \times 10^{-16}$ $cm^2/s$ at about 573 K to about $8.00 \times 10^{-6}$ $cm^2/s$ at about 2,098 K. By comparison, the diffusivity of atomic hydrogen in Pd at about 1,000 K is about $5 \times 10^{-4}$ $cm^2/s$, and can serve as a target diffusivity for certain implementations. Modifying the V lattice by alloying or doping with a secondary metal can yield enhanced diffusivities comparable to, or exceeding, the target diffusivity. For example, doping the V lattice with Ru can enhance the diffusivity of atomic nitrogen by decreasing its stability at O-sites within the V lattice. Elevated temperatures (e.g., about 1,000 K to about 1,300 K) present under post-furnace conditions can further facilitate the diffusion of atomic nitrogen across the membrane 102.

Transport of nitrogen across the membrane 102 can be calculated with reference to an atomic flux, since molecular nitrogen dissociates prior to diffusion across the membrane 102. The flux of atomic nitrogen across a bulk V lattice can be represented as: $N_N = -D_M(\Delta C_N/\delta_M)$, where $N_N$ is the atomic flux, $D_M$ is the diffusivity across the membrane 102, $\Delta C_N$ is the change in atomic nitrogen concentration across the membrane 102, and $\delta_M$ is a membrane thickness. It will be understood that the equation for the atomic flux can be further generalized by replacing the diffusivity with a permeability of atomic nitrogen across the membrane 102. Values for parameters relevant to the atomic flux can be calculated for nitrogen and compared with those of hydrogen in Pd for the case where hydrogen is separated from a refinery fuel gas mixture generating about $10 \times 10^6$ scf/day at about 3 atm and including about 50 percent hydrogen mixed with methane, ethane, water, and $CO_2$ (compared to about $1.3 \times 10^6$ scf/min of flue gas at about 1 atm for a 500 MWe power plant). In this case, about 70 percent of the hydrogen is recovered using a membrane reactor technology with a hydrogen uptake rate of about 52.5 mol/s. A surface area of the membrane 102 can be obtained by dividing a molar flow rate uptake (e.g., absorbed into the membrane 102) by the atomic flux calculated using the above equation. Using a target membrane diffusivity of about $10^{-4}$ $cm^2/s$, a concentration gradient of about 0.0033 mol/L, and a membrane thickness of about 1 μm, the target atomic flux for nitrogen is about $7.26 \times 10^{-6}$ mol/s*$cm^2$, which yields a surface area of about $1.09 \times 10^6$ $m^2$ assuming an uptake rate of about 36,000 mol/s of atomic nitrogen or about 18,000 mol/s of molecular nitrogen entering or exiting the membrane 102. Values used in carrying out these calculations for nitrogen and hydrogen are set forth in Table 1 below.

TABLE 1

| | Nitrogen | [a]Hydrogen |
|---|---|---|
| $D_M$ [$cm^2/s$] | V/Exp: $4.13 \times 10^{-7}$ RuV/Theory: $10^{-4}$ (1300K) | $5 \times 10^{-4}$ (1000K) |
| $\Delta C_i$ [mol/L] | 0.0033 | 0.003 |
| $p_{i(in)}$ [atm] | 0.74 | 0.69 |
| $p_{i(out)}$ [atm] | 0.37 | 0.35 |
| $\delta_M$ [cm] | $1.0 \times 10^{-4}$ | $1.0 \times 10^{-4}$ |
| $N_i$ [mol/s*$cm^2$] | $7.26 \times 10^{-6}$ | $15 \times 10^{-6}$ |
| $M_i$ [mol/s] | 36000 | 52.5 |
| SA [$m^2$] | $1.09 \times 10^6$ | 276 |

Through alloying or doping a primary metal (e.g., V) with a secondary metal (e.g., Ru), the membrane 102 can have further optimized values for its catalytic activity and transport characteristics towards nitrogen, such as a diffusion barrier in the range of about 0.26 eV to about 0.42 eV, a diffusivity in the range of about $2.2 \times 10^{-4}$ $cm^2/s$ to about $2.62 \times 10^{-3}$ $cm^2/s$, an atomic flux for nitrogen in the range of about $7.26 \times 10^{-6}$ mol/s*$cm^2$ to about $8.6 \times 10^{-5}$ mol/s*$cm^2$, a permeability in the range of about $1 \times 10^{-8}$ mol/(m s $Pa^{0.5}$) to about $1 \times 10^{-7}$ mol/(m s $Pa^{0.5}$), a $N_2$ dissociation barrier in the range of about 0.4 eV to about 0.5 eV, a surface-subsurface barrier in the range of about 0.747 eV to about 0.9 eV, and a nitrogen-turnover-to-ammonia rate in the range of about 8 sites to about 10 $site^{-1}$ $s^{-1}$, where these values are specified for a temperature in the range of about 1,000 K to about 1,300 K, such as about 1,000 K or about 1,300 K.

Still referring to FIG. 1, the nitrogen-permeable structure 100 is multi-layered, in which the membrane 102 corresponds to an inner layer and is concentrically positioned adjacent to a porous support 112 that corresponds to an outer layer. The porous support 112 can be implemented using, for example, porous stainless steel having a pore size (e.g., an average pore diameter) sufficient to allow passage of $N_2$ or another gaseous species of interest. It is contemplated that the relative positions of the membrane 102 and the porous support 112 can be reversed for other implementations.

During manufacturing of the nitrogen-permeable structure 100, the membrane 102 can be formed adjacent to the porous support 112, such as through sputtering, chemical vapor deposition, or another suitable deposition technique, or can be pre-formed as a foil and then laminated adjacent to the porous support 112, such as through application of heat or pressure. In the case of deposition, a primary metal and a secondary metal can be co-deposited to produce an alloy, sequentially deposited and then reacted to produce an alloy or can be reacted to produce an alloy that is then deposited adjacent to the porous support 112.

Although the thickness of the membrane 102 can be reduced to enhance the flux of atomic nitrogen, the membrane 102 should be substantially gas-tight to avoid or reduce leakage through pin-holes or other defects. In terms of balancing between these competing considerations, the thickness of the membrane 102 can be, for example, no greater than about 40 µm, such as no greater than about 30 µm, no greater than about 20 or no greater than about 10 µm, and down to about 5 µm, down to about 1 or less. Such thickness of the membrane 102 can provide a desirable atomic flux, while retaining structural integrity of the membrane 102 and avoiding or reducing leakage paths through the membrane 102. Operation of the membrane 102 can be carried out at, or near, atmospheric pressure, such as by taking advantage of the high partial pressure of $N_2$ on the feed side and employing a slight vacuum or a $H_2$ sweep gas on the permeate side. As such, bursting of the membrane 102 is a lesser design constraint, relative to other membrane technologies that are operated under high pressures. As illustrated in FIG. 1, the nitrogen-permeable structure 100 also includes an oxide layer 114, such as an alumina layer, which is concentrically positioned between the membrane 102 and the porous support 112 and serves to inhibit intermetallic diffusion.

The selective-nitrogen technology explained above has a number of other uses in addition to indirect $CO_2$ capture in coal-fired power plants. Also, although certain embodiments are explained above with reference to nitrogen, it is contemplated that additional embodiments can be implemented to allow adsorption and dissociation of other small molecules (e.g., $O_2$, $H_2$, or CO), as well as subsequent atomic diffusion through a bulk crystalline structure (e.g., diffusion of O, H, or C).

Figure 3:
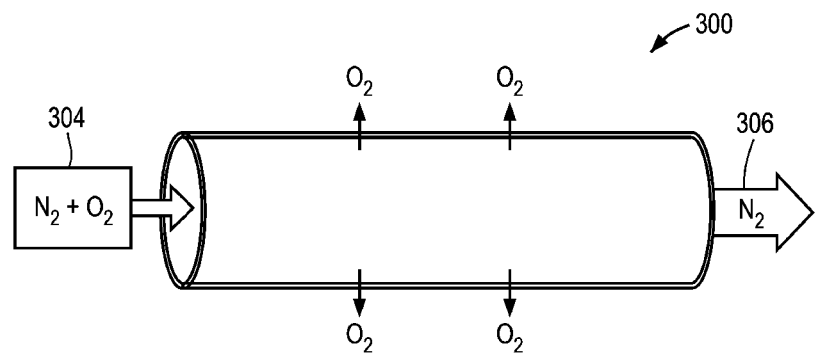
FIG. 3 illustrates a nitrogen-permeable structure implemented for selective removal of $N_2$ from air, according to an embodiment of the invention.

For example, and referring to FIG. 3 for the case of air separation, molecular oxygen (e.g., $O_2$) can be preferentially dissociated and transported as atomic oxygen (e.g., O) across a dense membrane, by leveraging the lower dissociation barrier for oxygen relative to nitrogen. More specifically, an oxygen-permeable structure 300 is implemented for selective removal of $O_2$ from air, in which a feed stream 304 of air enters the oxygen-permeable structure 300, is conveyed through an inner passageway, and then exits as an output stream 306. As the feed stream 304 is conveyed through the inner passageway, molecular oxygen is captured and transported as atomic oxygen across the oxygen-permeable structure 300. In such manner, the output stream 306 is enriched in $N_2$. Once transported across the oxygen-permeable structure 300, atomic oxygen undergoes recombination and desorption back to molecular oxygen that is released adjacent to an exterior of the oxygen-permeable structure 300. The captured oxygen can be stored or conveyed to a subsequent stage in an Integrated Gasification Combined Cycle ("IGCC") plant or an oxy-combustion plant. It is also contemplated that the feed stream 304 can be conveyed across the exterior of the oxygen-permeable structure 300, such that oxygen is captured and transported across the oxygen-permeable structure 300 for release within the inner passageway. It is further contemplated that a dense membrane can be similarly implemented for selective removal of $N_2$ from natural gas.

Figure 4:
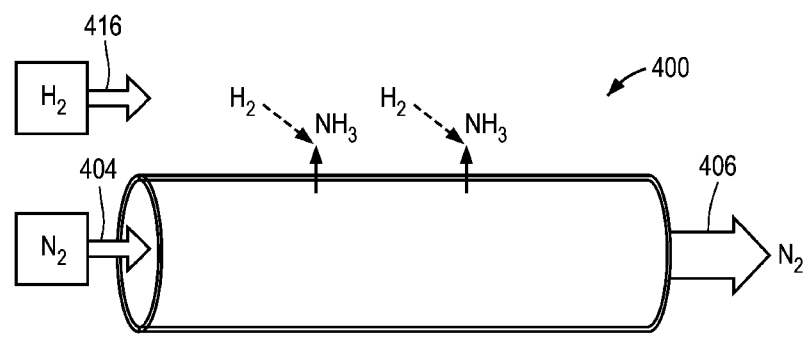
FIG. 4 illustrates a nitrogen-permeable structure implemented for ammonia synthesis, according to an embodiment of the invention.

As another example, and referring to FIG. 4, a nitrogen-permeable structure 400 is implemented for chemical synthesis, in which a feed stream 404 of substantially pure $N_2$ enters the nitrogen-permeable structure 400, is conveyed through an inner passageway, and then exits as an output stream 406 that can be recycled back and combined with the feed stream 404. In the illustrated embodiment, a stream 416 of $H_2$ as a sweep gas is conveyed across an exterior of the nitrogen-permeable structure 400. As the feed stream 404 is conveyed through the inner passageway, molecular nitrogen is captured and transported as atomic nitrogen across the nitrogen-permeable structure 400. Once transported across the nitrogen-permeable structure 400, atomic nitrogen reacts with $H_2$ to produce ammonia via the reaction: $2*N+3H_2 \rightarrow 2NH_3$. In such manner, ammonia can be readily produced through direct hydrogenation with $H_2$ of atomic nitrogen and under moderate conditions of pressure. It is also contemplated that the feed stream 404 can be conveyed across the exterior of the nitrogen-permeable structure 400, while the stream 416 of $H_2$ can be conveyed through the inner passageway. It is further contemplated that the nitrogen-permeable structure 400 can be similarly implemented to carry out both indirect $CO_2$ capture and ammonia synthesis in coal-fired power plants.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Material Screening Using Density Functional Theory ("DFT") Simulations

DFT simulations are carried out to understand how $N_2$ adsorbs to V surfaces and how its adsorption can compete against $CO_2$ adsorption. Additionally, simulations are carried out to determine the hopping mechanism of atomic nitrogen in bulk V and its corresponding diffusivity. Simulation data agrees well with experimental data that was available. Additionally, it is observed that, by doping V with Ru, the electronic structure of V can be tuned to influence a hopping barrier of atomic nitrogen in the bulk.

Surface reactivity is investigated through reaction pathway investigations of dissociative $N_2$ adsorption on a feed side of a membrane and associative desorption, in addition to ammonia synthesis, on a permeate side of the membrane. Initially, minimum free energies of reactant, intermediate, and product species are calculated to determine the most thermodynamically stable pathway. Due to the tightly packed nature of crystals, a harmonic approximation to transition state theory ("hTST") is used for diffusion and reaction studies in crystals or at crystal surfaces. Rate constant calculations based upon hTST are carried out using Eqn. (1):

$$k^{hTST}(T) = \frac{\prod_i^{3N} v_i^{init}}{\prod_i^{3N-1} v_i^{TS}} \exp\left(-\frac{(E^{TS} - E^{init})}{k_B T}\right). \quad (1)$$

where $v_i^{init}$ and $v_i^{TS}$ are vibrational frequencies of initial and transition structures, respectively, and the difference, $E^{TS} - E^{init}$, is an activation barrier along a minimum energy path ("MEP"). The MEP and transition structures are calculated using a climbing image nudged elastic band ("CI-NEB") method. Within the CI-NEB method, a series of configurations, namely "images," between initial and final configurations are connected by springs and allowed to relax simultaneously to the MEP. Additional details regarding the CI-NEB method can be found in Sonwane et al., "Achieving Optimum Hydrogen Permeability in PdAg and PdAu Alloys," *J. Chem. Phys.*, 125(18), 184714 (2006) and Sonwane et al., "Solubility of Hydrogen in PdAg and PdAu Binary Alloys Using Density Functional Theory," *J. Phys. Chem. B*, 110(48), 24549-24558 (2006), the disclosures of which are incorporated herein by reference in their entirety.

Bulk V crystal lattices are modeled with a periodic 2×2×2 bcc cell corresponding to a supercell of 16 atoms. VRu alloy simulations are carried out by replacing V atoms with Ru atoms at specific nearest-neighbor locations around T- and O-sites of nitrogen. Based on the phase diagram of VRu alloys, a total concentration of Ru atoms is kept below 15 percent (by weight) to maintain the bcc structure of V. Simulations are run for a range of nitrogen concentrations corresponding to c=0.0625 (6.25 at. percent), 0.125 (12.5 at. percent), and 0.25 (25 at. percent). Nitrogen atoms are placed at specific interstitial locations, and all the atoms are allowed to relax to their equilibrium positions. The relaxation is performed with a conjugate-gradient method until the force on all of the unconstrained atoms is less than 0.01 eV/Å. Nitrogen is initially placed at both T- and O-sites, but the final configuration converges to the O-sites, thereby indicating that the T-sites are typically not a stable location for nitrogen atoms in the bcc crystal structure of V. An absorption energy of nitrogen at the O-sites is calculated using Eqn. (2):

$$E_{abs} = E_{bulk+N} - E_{bulk} - \tfrac{1}{2} E_{N_2}. \quad (2)$$

where the energy terms on the right-hand side represent the material with the nitrogen absorbed at an appropriate site, the bulk material, and the gas-phase nitrogen. The strength of the absorption energy at a given site is a measure of the stability of that site and provides information about the solubility of nitrogen in the material. Large negative absorption energies indicate a stable binding site, while positive energies can be inferred as a site that will tend to be unoccupied. The atomic charge of nitrogen is calculated using a Bader charge analysis. Within the Bader analysis, a continuous electron density is partitioned into regions bounded by a minima of a charge density.

Pure V and its alloys are simulated as three-dimensional infinite periodic structures by defining a supercell and periodic boundary conditions in all three principal axes. Simulations are carried out using Vienna ab initio Simulation Package. Electron exchange correlation effects are incorporated by a generalized-gradient approximation using the Perdew, Burke and Ernzerhof functional with a plane-wave expansion. A plane-wave expansion cutoff of 450 eV is applied, and a surface Brillouin zone integration is calculated using a gamma-centered 4×4×4 Monkhorst-Pack mesh. Methfessel and Paxton Gaussian smearing of order 1 is used with a width of 0.2 eV to accelerate convergence of total energy calculations. Geometric optimization is performed using the conjugate-gradient method until an absolute value of the forces on unconstrained atoms is less than 0.03 eV/Å.

As an initial stage of the procedure, an analysis of available material composition phase diagrams is performed. This analysis verifies that a material of interest is thermodynamically stable at compositions of interest. Ranges of compositions are determined, and accurate model crystal structures and phase (e.g., bcc, fcc, and so forth) are verified by comparing the DFT-predicted lattice constant to experimental data. Additionally, to validate the choice of basis set used within a DFT code, molecular geometries, X-ray photoelectron spectroscopy ("XPS") binding energies, HOMO-LUMO gaps, and vibrational frequencies of the gas-phase adsorption species are compared against experimental data. From this point, surface and bulk simulations are carried out. The surface simulations allow understanding of surface-site preference for $N_2$ dissociation. A density of states analysis is carried out so that mechanisms of dissociation can be understood and compared with experimentally derived atom specific projected states from X-ray emission spectroscopy ("XES") and X-ray absorption spectroscopy ("XAS"). Within the bulk simulations, binding and hopping activation energies are used for the calculation of solubility and diffusivity, respectively. Again, a density of states analysis is carried out to determine mechanisms of binding within the bulk lattice and compared with experimental XAS and XES data. A final nitrogen permeability is then calculated as proportional to a product of the solubility and diffusivity.

Nitrogen solubilities are calculated using plane wave DFT to determine binding energies along with Sieverts' constant to obtain solubility predictions. A diffusion coefficient is estimated using the kinetic Monte Carlo ("kMC") approach, involving a first passage time ("FPT") method that includes the use of Einstein's equation. Rate constants are used for defining a hopping probability for the kMC simulations, and are estimated using an activation energy associated with each type of hop, that is, O→T (octahedral- to tetrahedral-site), T→O (tetrahedral- to octahedral-site), T→T (tetrahedral- to tetrahedral-site), and O→O (octahedral- to octahedral-site). Within a V bulk crystal, the primary mechanism of nitrogen hopping is expected to be via O→O hops. Cell expansion as a function of nitrogen concentration within the material is also taken into account within the solubility and diffusivity predictions.

The following operations are carried out for the solubility predictions:

(a) Calculate a nitrogen absorption energy: A binding energy is a function of nearest-neighbor ("NN") and next nearest-neighbor ("NNN") sites based upon a local alloy composition, since doping the V lattice with alloying atoms such as Ru is also considered.

(b) Calculate Sieverts' constant using Eqn. (3): When solubility is discussed, the term "absorption" is used, since it pertains to a nitrogen capacity of a given material.

$$K_S = \exp\left(\beta\left[-\frac{D_E}{2} + \frac{h v_{N_2}}{4} - E_{abs} - \frac{3}{2} h v_N\right]\right) \cdot \frac{1}{\sqrt{\alpha}} \quad (3)$$
$$\sqrt{1 - \exp(-\beta h v_{N_2}/2)} \frac{1}{(1 - e^{-\beta h v_N})},$$

where $\beta = 1/k_B T$, $k_B$ is Boltzmann's constant, $D_E$ is the classical dissociation energy, $E_{abs}$ is the absorption energy, h is Planck's constant, $\alpha$ is a function of I and m, I is a molecular moment of inertia, $v_N$ and $v_{N2}$ are vibrational frequencies of nitrogen in V and the gas phase, respectively, and m is the mass of the $N_2$ molecule. The solubility is estimated using θ32 $K_s P_{N2}^{1/2}$, where θ is the solubility, $K_s$ is Sieverts' constant, and $P_{N2}$ is the $N_2$ partial pressure in the gas phase.

The following operations are carried out for the diffusivity predictions:

(a) A kinetic rate constant for individual hops is calculated using Eqn. (4):

$$k = \frac{v_1^* v_2^*}{v_1 v_2 v_3} \exp\left(-\frac{E_a - \varepsilon_{zp} + \varepsilon_{zp}^*}{k_B T}\right). \quad (4)$$

where $v_i$ is a normal mode frequency for an energy minimum at the O- or T-site, $v_j^*$ is a normal mode frequency for a transition state, $\varepsilon_{zp}$ is a zero-point energy of nitrogen at the energy minimum, $\varepsilon_{zp}^*$ is a zero-point energy at the transition state, $E_a$ is an activation energy barrier ($E_{TS}-E_T$) or ($E_{TS}-E_O$) for O→T or T→O hops, respectively, $k_B$ is Boltzmann's constant, and T is the temperature of the system. A zero-point energy correction is estimated using $E_N^{ZP} = \frac{1}{2}h\Sigma v_i^N$, where h is Planck's constant, and $v_i^N$ are individual vibrational modes of atomic nitrogen in the lattice associated with a given site.

(b) kMC simulations are used along with Einstein's equation to calculate diffusion coefficients.

Following nitrogen placement, a random-number generator with an input seed is used for the kMC simulations. Using V as an example, each O→O hop (that is, O-TS-O) is accepted with a probability of 1, since nitrogen bound to an O-site represents a lower energy state than when bound to a T-site. Each O→T hop is accepted with a probability of $2k_{OT}/k_{TO}$ or higher. For each cell, the number of T-sites is double that of O-sites, and is accounted for in the probability of hops from O- to T-sites. Regardless of the outcome of each attempted hop, the time is incremented by $1/(4Nk_{TO})$, where N is the total number of nitrogen atoms.

A classical method of estimating a diffusion coefficient involves a measurement of a distance between each atom (at time t=t1) from its starting position (t=0) and then averaging distances of several atoms at a given time. The classical method, however, can suffer from errors associated with edge effects of a lattice boundary. This deficiency can be overcome by modifying the classical method according to (a) the FPT method and (b) by releasing nitrogen atoms in a central spherical space. In the FPT method, the time to cross a certain distance from a starting position for the first time is counted and used for the estimation of the diffusion coefficient using Eqn. (5):

$$D = \lim_{t \to \infty}\left[\frac{1}{6Nt}\sum_{i=1}^{N}\langle|R_i(t) - R_i(0)|^2\rangle\right], \quad (5)$$

where $R_i(t)$ is the position of an atom at time t, and N is the number of nitrogen atoms.

Example 2

Results of DFT Simulations

Adsorption of $N_2$ on V(110) and Density of States

Figure 5:
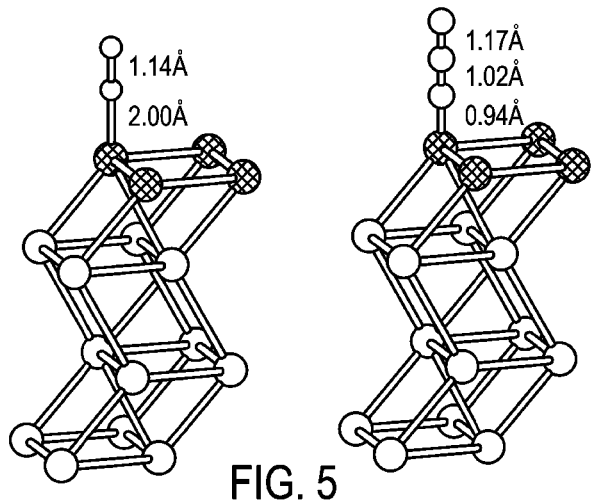
FIG. 5 illustrates simulated structures corresponding to $N_2$ and $CO_2$ molecules adsorbed on V surfaces, according to an embodiment of the invention.

To investigate the relative stability of $N_2$ versus $CO_2$ on a V surface, adsorption simulations were carried out for these molecules on a V(110) surface. In bcc crystals, the 110 is typically energetically stable, since it is typically the most closed-packed surface. As confirmed with DFT simulations, a surface energy of the 110 surface is about 4 eV lower than that of the 100 surface. Surfaces were simulated using 4 layers, with the bottom two layers fixed, and a 10 Å vacuum layer to avoid interactions with periodic images. Simulations were carried out with $N_2$ and $CO_2$ molecules at ¼ coverage on the top site and oriented perpendicular to the surface. Final simulated structures are illustrated in FIG. 5. A binding energy of $N_2$ is calculated to be quite stable (−0.56 eV) on this site via an exothermic adsorption process. In comparison, binding of a $CO_2$ molecule is found to be unstable, involving the application of +0.9 eV of energy to allow adsorption to the surface. Calculations were also carried out with the $CO_2$ molecule oriented parallel to the surface, and this orientation was found to be even less stable by more than an order of magnitude. From these calculations, little binding of $CO_2$ molecules is expected on a V surface. On the other hand, $N_2$ molecules are expected to bind strongly, even on clean, defect-free surfaces.

Figure 6:
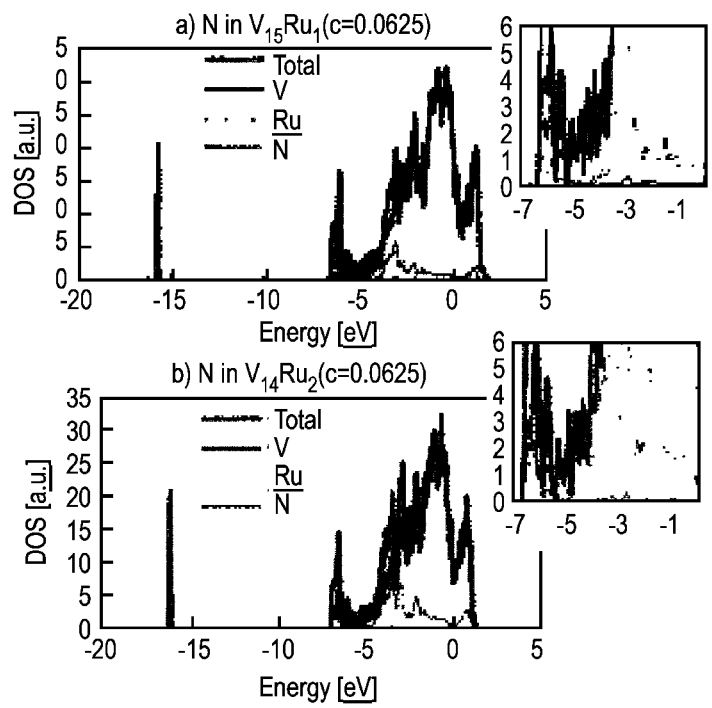
FIG. 6 is a plot of density of states for atomic nitrogen in two different VRu alloys, according to an embodiment of the invention.

FIG. 6 is a plot of density of states for atomic nitrogen in two different VRu alloys: a) $V_{15}Ru_1$ and b) $V_{14}Ru_2$. In both cases, there are two peaks that represent an existing interaction between nitrogen and V. The strongest interaction corresponds to a sharp peak at about −16 eV, and a second peak is more diffuse at about −6 eV. Increasing the local Ru concentration yields a slight broadening of a nitrogen peak and an increased interaction with Ru, which is evident in FIG. 6b at about −3 eV. The increased interaction between nitrogen and Ru is expected to destabilize nitrogen at an O-site, depending upon a distance between nitrogen and Ru.

Example 3

Results of DFT Simulations

Adsorption of $N_2$ on V(110) and V(111) and Dissociation Pathway

Figure 7:
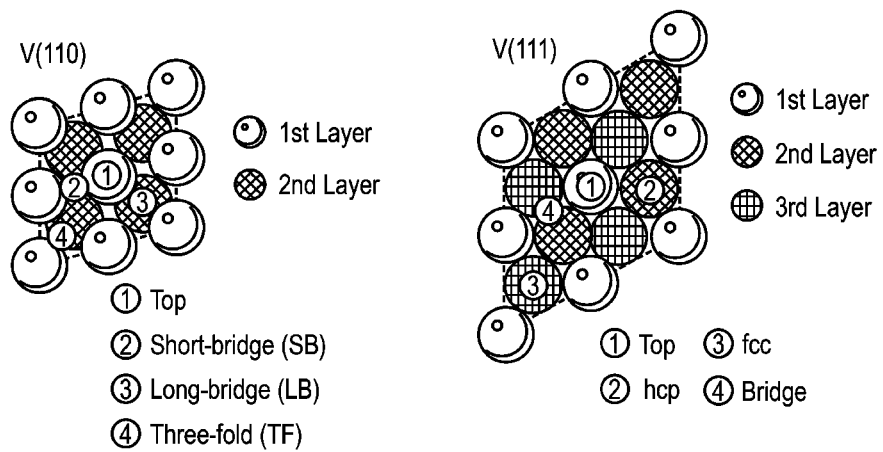
FIG. 7 illustrates various binding sites on V(110) and V(111) surfaces, according to an embodiment of the invention.
Figure 8:
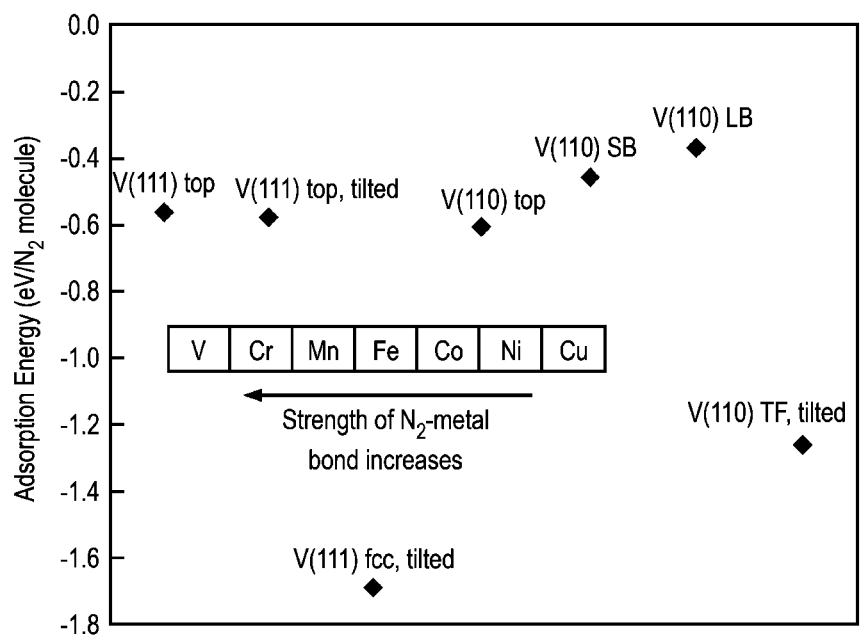
FIG. 8 is a plot of calculated binding energies for various binding sites on V(110) and V(111) surfaces, according to an embodiment of the invention.

Adsorption simulations were carried out for $N_2$ molecules on V(110) and V(111) surfaces. Surfaces were simulated using 7 layers, where the top 3 layers are allowed to relax. FIG. 7 illustrates various binding sites on the V(110) and V(111) surfaces, and FIG. 8 is a plot of calculated binding energies (i.e., adsorption energies in this context) for these binding sites. Calculations were carried out with the $N_2$ molecules oriented perpendicular to the surfaces and oriented at an angle of about 45° relative to the surfaces (denoted as "titled" in FIG. 8). Binding of $N_2$ is calculated to be quite stable on various sites via an exothermic adsorption process.

Figure 9:
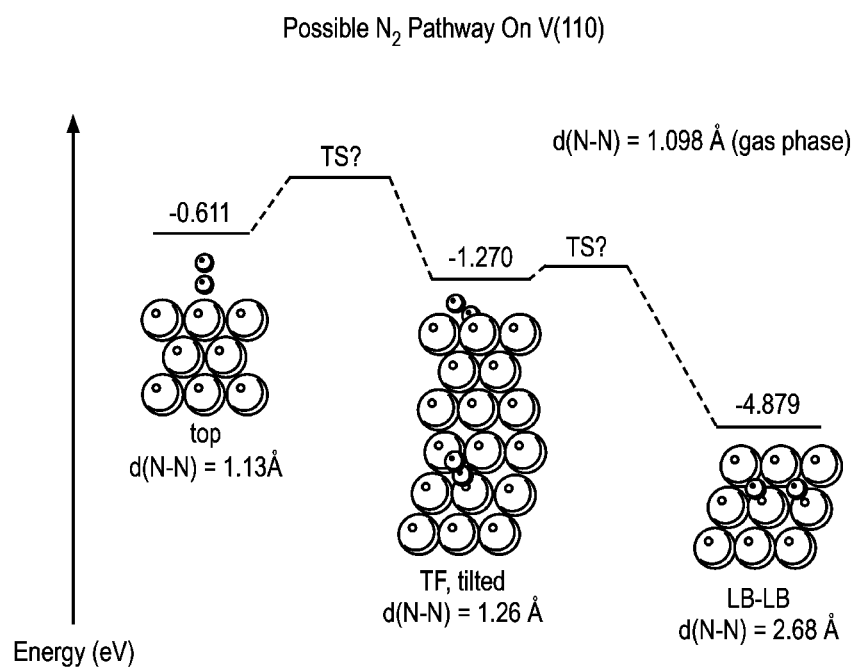
FIG. 9 illustrates a possible dissociation pathway of $N_2$ on a V(110) surface, according to an embodiment of the invention.

Possible dissociation pathways for $N_2$ molecules on V(110) and V(111) surfaces were investigated. FIG. 9 illustrates a possible dissociation pathway on a V(110) surface, including a $N_2$ molecule initially bound to a top site on the surface, a set of transition states, and dissociated nitrogen atoms bound to respective long-bridge sites on the surface.

Example 4

Results of DFT Simulations

Absorption of Nitrogen in V

Figure 10:
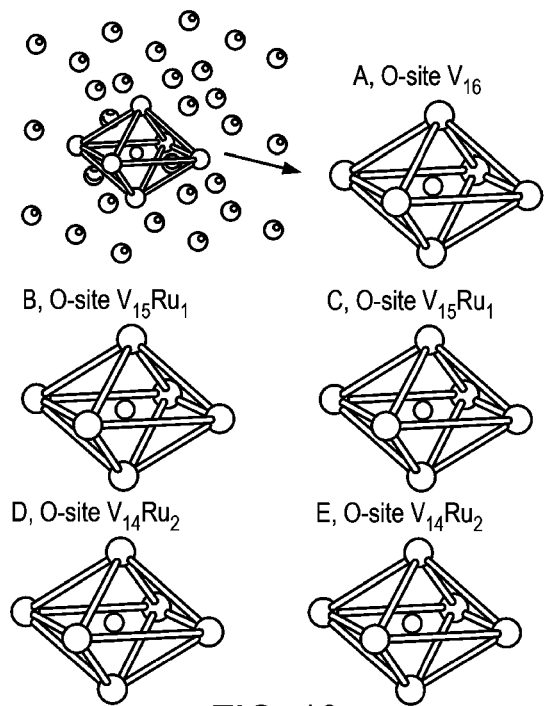
FIG. 10 illustrates various configurations of nitrogen in a bcc lattice, according to an embodiment of the invention.

For bulk diffusion simulations, nitrogen atoms are placed at O-sites of a pure V crystal and within VRu alloys with different neighboring atomic configurations. FIG. 10 illustrates various configurations of nitrogen in a bcc lattice, where atoms that form an octahedral nearest-neighbor shell are emphasized for clarity. Binding energies (i.e., absorption energies in this context) and Bader charges that correspond to each of the configurations are set forth in Table 2 below. A nitrogen atom is bound most strongly at the O-site of the pure V lattice, and addition of Ru as a doping material acts to reduce the interaction between V and nitrogen, thereby weakening the binding energy. This can be an important factor since maximizing permeability for nitrogen is influenced by both its diffusivity and its solubility. If atomic nitrogen is too soluble, that is, too stable as the nitrogen concentration increases, then diffusion can be limited. Accordingly, a dopant, such as Ru, is desirable so that transport characteristics can be optimally tuned. Weakening of the binding energy also can be observed through the Bader charge of a nitrogen atom set forth in Table 2. In all cases, the nitrogen atom is gaining on the order of two electrons from the crystal. As the interaction between V and nitrogen decreases, the amount of charge density gained by the nitrogen atom can also decrease. This behavior agrees well with the electronegativities of each of these atoms (nitrogen=3.04, Ru=2.3, V=1.63). In addition to weakening the binding energy of nitrogen when Ru is located in the nearest-neighbor (or next nearest-neighbor) shell, higher concentrations of Ru can reduce the number of O-sites available for binding by lowering the stability of nitrogen at those sites. For example, in a configuration with two neighboring Ru atoms, the absorption energy is positive, which indicates that the site is no longer a stable binding site.

TABLE 2

| Composition | Configuration | Eabs [eV] | Q [E−] |
|---|---|---|---|
| $V_{16}$ | A | −2.37 | −2.14 |
| $V_{15}Ru_1$ | B | −1.68 | −2.00 |
| $V_{15}Ru_1$ | C | −1.30 | −1.99 |
| $V_{15}Ru_1$ | | −2.26 | −2.16 |
| $V_{14}Ru_2$ | D | −0.78 | −1.90 |
| $V_{14}Ru_2$ | E | −0.39 | −1.92 |
| $V_{14}Ru_2$ | | 0.19 | −1.93 |

Figure 11:
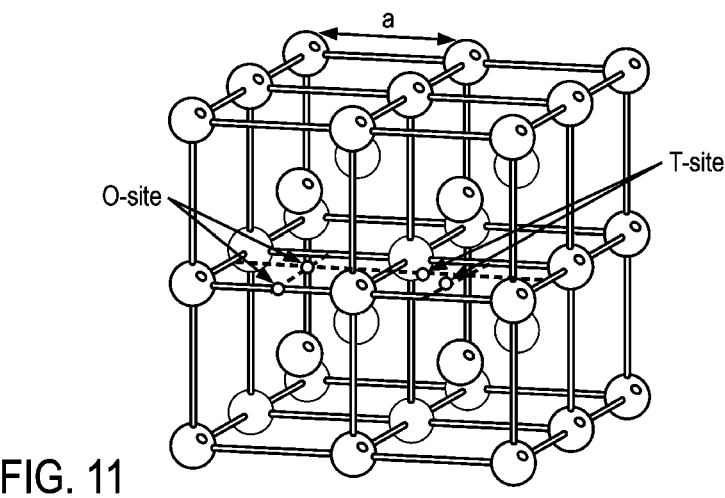
FIG. 11 illustrates various O- and T-sites of nitrogen in a bcc lattice of pure V, according to an embodiment of the invention.
Figure 12:
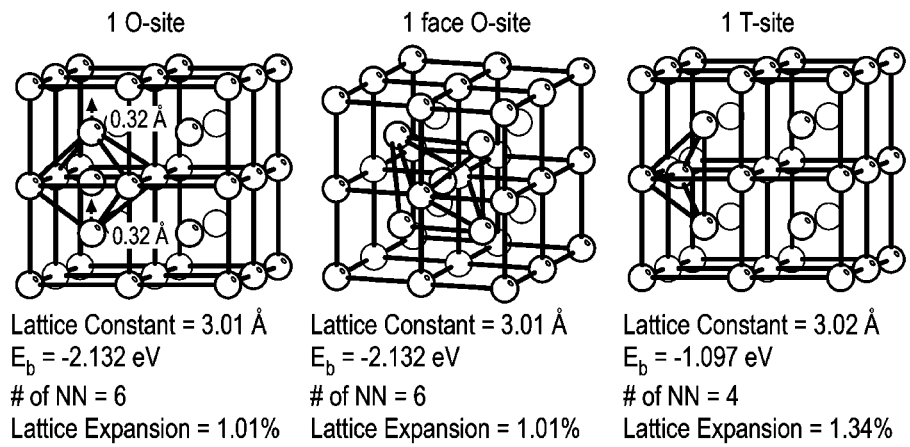
FIG. 12 illustrates calculated absorption energies for various O- and T-sites of nitrogen in a bcc lattice of pure V, according to an embodiment of the invention.

Simulations were also carried out by placing nitrogen atoms at O- and T-sites with different neighboring atomic configurations. FIG. 11 illustrates various O- and T-sites of nitrogen in a bcc lattice of pure V, and FIG. 12 illustrates calculated absorption energies for some of those sites. Nitrogen binding to the O-site is more stable, although binding to both O- and T-sites are possible at lower nitrogen concentrations.

Figure 13:
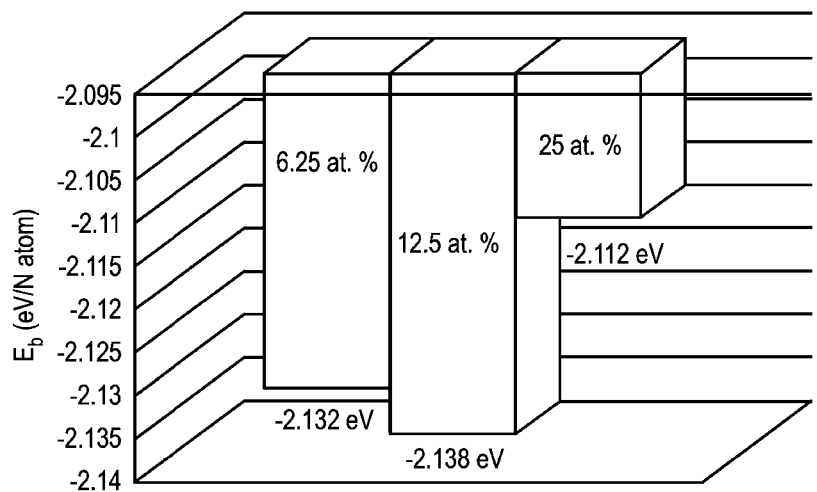
FIG. 13 is a plot of absorption energy of nitrogen in a bcc lattice as a function of concentration of atomic nitrogen, according to an embodiment of the invention.

To investigate the influence of higher concentrations of atomic nitrogen on the absorption energy, simulations were also carried out with 2 and 4 nitrogen atoms in the 16-atom unit cell. Partial density of states was calculated by projecting electron wave functions onto spherical harmonics centered on nitrogen and metal atoms. FIG. 13 is a plot of absorption energy as a function of concentration of atomic nitrogen. Increasing the nitrogen concentration yielded an initial slight increase in the absorption energy, followed by a decrease in the absorption energy (and a reduced stability) at a higher concentration of atomic nitrogen. This decrease in the absorption energy can at least partly arise from lattice expansion at higher concentrations of atomic nitrogen (e.g., 1.01 percent for 6.25 at. percent of nitrogen, 2.35 percent for 12.5 at. percent of nitrogen, and 4.03 percent for 25 at. percent of nitrogen). As the absorption energy decreases, it is expected that the amount of charge density gained by a nitrogen atom can also decrease.

Example 5

Results of DFT Simulations

Bulk Diffusivity of Nitrogen in V

Figure 14:
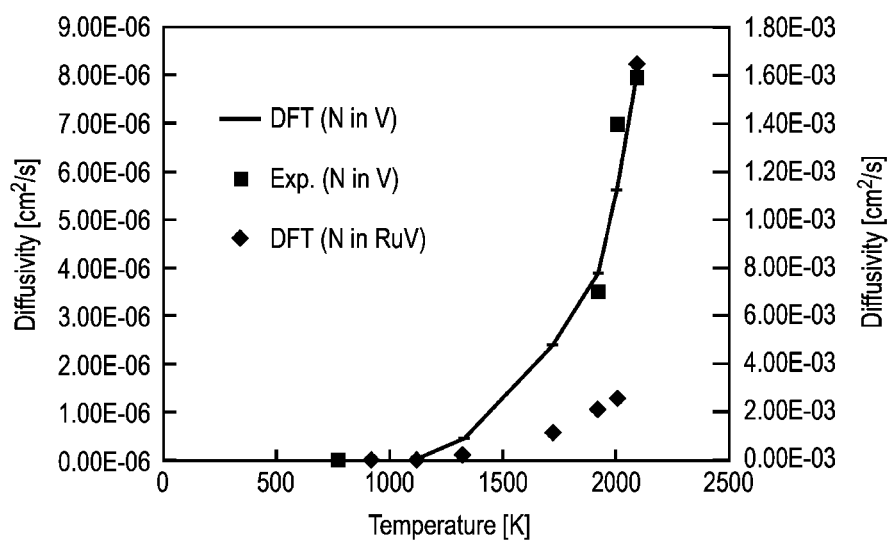
FIG. 14 is a plot of kMC-calculated diffusivity and experimentally-measured diffusivity as a function of temperature, according to an embodiment of the invention.

Nudged elastic band calculations were carried out to investigate pathways, transition states, and corresponding activation barriers associated with O—O hopping in pure V crystal compared with VRu alloys. Calculations were carried out for atomic nitrogen in the pure V crystal and in the VRu alloys, with the initial and final O-site configurations defined by B and C in FIG. 10, respectively. In pure V, an activation barrier calculated with DFT is about 1.1 eV. This value is about 4 times that of the hydrogen diffusion barrier in bulk PdCu alloys. In comparison, experimental measurements of nitrogen diffusion yield a value of about 1.4 eV. The difference between theory and experiment likely stems from the assumption of perfectly crystalline periodic structures in the simulations. Addition of a single Ru atom in the lattice reduces the activation barrier to about 0.42 eV, which results in a substantially higher probability of hopping. To investigate how this reduction in activation barrier translates into a modification of nitrogen diffusivity, simulations were carried out with kMC to determine the diffusivity at high temperatures. The kMC-calculated diffusivity is plotted against experimental measurements in FIG. 14 as a function of temperature. To investigate how alloying a V crystal with Ru can influence nitrogen diffusion, simulations were carried out assuming the dominant hopping mechanism is from an O-site with only V atoms to an O-site with a single Ru atom at one corner. As can be observed in FIG. 14, a reduction in the activation barrier with the addition of the Ru dopant results in an increase in the diffusivity by several orders of magnitude at temperatures approaching 2000 K.

Example 6

Results of DFT Simulations

Charge Density

Figure 15:
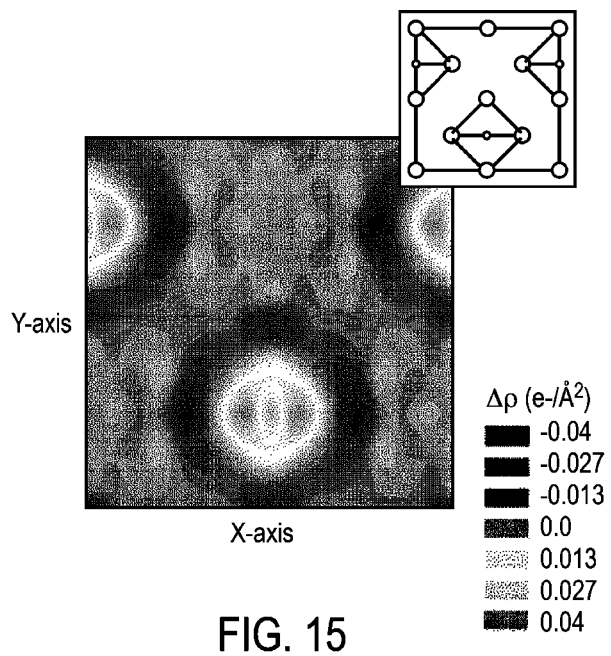
FIG. 15 is a plot of a charge density difference for nitrogen at an O-site of pure V, according to an embodiment of the invention.

Increasing a concentration of atomic nitrogen in a pure V crystal changes an absorption energy of each individual nitrogen atom, with a smaller change observed in the density of states and in the Bader charge of nitrogen. This trend suggests that the change in absorption energy is primarily due to geometric effects, although electronic effects can also play a role and, for example, can arise from a cooperative expansion of the lattice at higher concentrations. To investigate a spatial distribution of the charge density resulting from interstitial nitrogen, a charge density difference is averaged along the z-axis and is calculated using Eqn. (6):

$$\Delta \rho(x, y) = \frac{1}{L_z} \int dz [\rho(x, y) - \rho_{bulk}(x, y) - \rho_{N_2}(x, y)] \quad (6)$$

where $L_z$ is the length of an unit cell in the z-direction, $\rho(x,y)$ is an average charge density in the (x,y) plane of the V lattice with the absorbed nitrogen, $\rho_{bulk}(x,y)$ is an average charge density in the (x,y) plane with the nitrogen removed, and $\rho_{N_2}(x,y)$ is an average charge density with the V atoms removed. A plot of the charge density difference for nitrogen at an O-site of pure V at a concentration of c=0.125 is illustrated in FIG. 15. A positive increase in the charge density represents an increase in the number of electrons, which is shown at the position of the nitrogen atoms. Surrounding each nitrogen atom is a negative charge difference, which represents a decrease in the number of electrons from the V atoms consistent with nitrogen's higher electronegativity. The localization of the charge density around each nitrogen atom can be seen in FIG. 15, with little interaction between neighboring occupied O-sites that is consistent with density of state results.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A nitrogen-permeable structure, comprising:
a porous support; and
a nitrogen-permeable membrane adjacent to the porous support and including a first metal and a second metal, wherein the first metal is selected from vanadium, niobium, and tantalum, and the second metal is different from the first metal,
wherein an amount of the second metal is no greater than 5 percent by weight, and the second metal is ruthenium.

2. The nitrogen-permeable structure of claim 1, wherein the first metal is vanadium.

3. The nitrogen-permeable structure of claim 2, wherein the first metal is at least one of alloyed and doped with the second metal.

4. The nitrogen-permeable structure of claim 2, wherein the nitrogen-permeable membrane is substantially non-porous.

5. The nitrogen-permeable structure of claim 2, wherein the nitrogen-permeable membrane is selectively permeable towards nitrogen.

6. The nitrogen-permeable structure of claim 2, wherein the nitrogen-permeable membrane is configured to facilitate: (a) adsorption of molecular nitrogen onto the nitrogen-permeable membrane; (b) dissociation of the molecular nitrogen into atomic nitrogen; and (c) transport of the atomic nitrogen through the nitrogen-permeable membrane.

7. The nitrogen-permeable structure of claim 2, wherein a thickness of the nitrogen-permeable membrane is no greater than 40 μm.

8. The nitrogen-permeable structure of claim 2, wherein a permeability of the nitrogen-permeable membrane towards atomic nitrogen is at least $1 \times 10^{-8}$ mol/(m s $Pa^{0.5}$) at 1000 K.

9. The nitrogen-permeable structure of claim 8, wherein the permeability of the nitrogen-permeable membrane towards atomic nitrogen is in the range of $1 \times 10^{-8}$ mol/(m s $Pa^{0.5}$) and $1 \times 10^{-7}$ mol/(m s $Pa^{0.5}$) at 1000 K.

10. A method of operating a nitrogen-permeable membrane, comprising:
providing a nitrogen-permeable membrane having a feed side and a permeate side, wherein the nitrogen-permeable membrane includes a first metal and a second metal, the first metal is selected from vanadium, niobium, and tantalum, and the first metal is at least one of alloyed and doped with the second metal that is different from the first metal; and
exposing the feed side of the nitrogen-permeable membrane to a feed stream including nitrogen, such that atomic nitrogen is transported across the nitrogen-permeable membrane from the feed side to the permeate side.

11. The method of claim 10, wherein the second metal is selected from cobalt, copper, gold, iron, nickel, palladium, platinum, ruthenium, and silver.

12. The method of claim 10, wherein the nitrogen-permeable membrane is selectively permeable towards the nitrogen in the feed stream, such that at least one gaseous species is substantially retained in the feed stream to produce an output stream.

13. The method of claim 12, wherein the feed stream corresponds to a stream of flue gas, and the at least one gaseous species includes carbon dioxide.

14. The method of claim 12, wherein the feed stream corresponds to a stream of air, and the at least one gaseous species includes oxygen.

15. The method of claim 10, further comprising:
exposing the permeate side of the nitrogen-permeable membrane to a stream of hydrogen; and
reacting the hydrogen and the atomic nitrogen that is transported across the nitrogen-permeable membrane to produce ammonia.

* * * * *